US012563561B2

(12) United States Patent
Yang et al.

(10) Patent No.: US 12,563,561 B2
(45) Date of Patent: Feb. 24, 2026

(54) SIGNALING ASPECTS OF APERIODIC CSI REPORTING TRIGGERED BY A DOWNLINK GRANT

(71) Applicant: QUALCOMM Incorporated, San Diego, CA (US)

(72) Inventors: Wei Yang, San Diego, CA (US); Yi Huang, San Diego, CA (US); Seyedkianoush Hosseini, San Diego, CA (US); Yu Zhang, San Diego, CA (US); Wanshi Chen, San Diego, CA (US); Peter Gaal, San Diego, CA (US); Krishna Kiran Mukkavilli, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 374 days.

(21) Appl. No.: 17/757,478

(22) PCT Filed: Jan. 20, 2020

(86) PCT No.: PCT/CN2020/073100
§ 371 (c)(1),
(2) Date: Jun. 16, 2022

(87) PCT Pub. No.: WO2021/146826
PCT Pub. Date: Jul. 29, 2021

(65) Prior Publication Data
US 2023/0016768 A1    Jan. 19, 2023

(51) Int. Cl.
*H04W 72/23* (2023.01)
*H04L 5/00* (2006.01)
(52) U.S. Cl.
CPC ............. *H04W 72/23* (2023.01); *H04L 5/001* (2013.01); *H04L 5/0048* (2013.01); *H04L 5/0057* (2013.01)

(58) Field of Classification Search
CPC . H04L 1/1671; H04L 1/18645; H04L 5/0057; H04L 5/001; H04L 5/0048; H04W 72/23
See application file for complete search history.

(56) References Cited

U.S. PATENT DOCUMENTS

| | | | | |
|---|---|---|---|---|
| 10,158,461 | B2 * | 12/2018 | Li | H04L 1/1671 |
| 11,617,195 | B2 * | 3/2023 | Huang | H04L 5/0053 |
| | | | | 370/329 |

(Continued)

FOREIGN PATENT DOCUMENTS

| | | |
|---|---|---|
| CN | 102215591 A | 10/2011 |
| CN | 102812658 A | 12/2012 |

(Continued)

OTHER PUBLICATIONS

3GPP: "3rd Generation Partnership Project, Technical Specification Group Radio Access Network, NR, Physical Layer Procedures for Data (Release 16)", 3GPP Standard, Technical Specification, 3GPP TS 38.214, 3rd Generation Partnership Project, Mobile Competence Centre, 650, Route Des Lucioles, F-06921, Sophia-Antipolis Cedex, France, vol. RAN WG1, No. V16.0.0, Dec. 2019, Jan. 14, 2020, XP051860777, pp. 1-147, Section 5.2.

(Continued)

*Primary Examiner* — Raj Jain
(74) *Attorney, Agent, or Firm* — Patterson & Sheridan LLP

(57) ABSTRACT

Aspects of the present disclosure provide techniques for configuring and triggering aperiodic channel state information (A-CSI) reporting via a downlink grant. As will be described in greater detail below, the A-CSI report may be conveyed via a physical uplink control channel (PUCCH).

31 Claims, 8 Drawing Sheets

(56) References Cited

U.S. PATENT DOCUMENTS

2020/0107319 A1\*  4/2020  Bagheri ................ H04W 24/10
2020/0336186 A1   10/2020  Chen et al.
2020/0389218 A1\*  12/2020  Faxér ................... H04L 5/0053
2022/0124711 A1\*   4/2022  Zhou .................... H04W 28/26
2023/0016768 A1\*   1/2023  Yang .................... H04L 5/0057

FOREIGN PATENT DOCUMENTS

CN        104038312  A    9/2014
CN        107210857  A    9/2017
WO       2017116209  A1   7/2017
WO       2018227538       12/2018
WO       2019080107  A1   5/2019
WO       2019093866  A1   5/2019

OTHER PUBLICATIONS

Supplementary European Search Report—EP20915298—Search Authoriy—The Hague—Sep. 22, 2023.
International Search Report and Written Opinion—PCT/CN2020/073100—ISA/EPO—Oct. 13, 2020.

\* cited by examiner

500

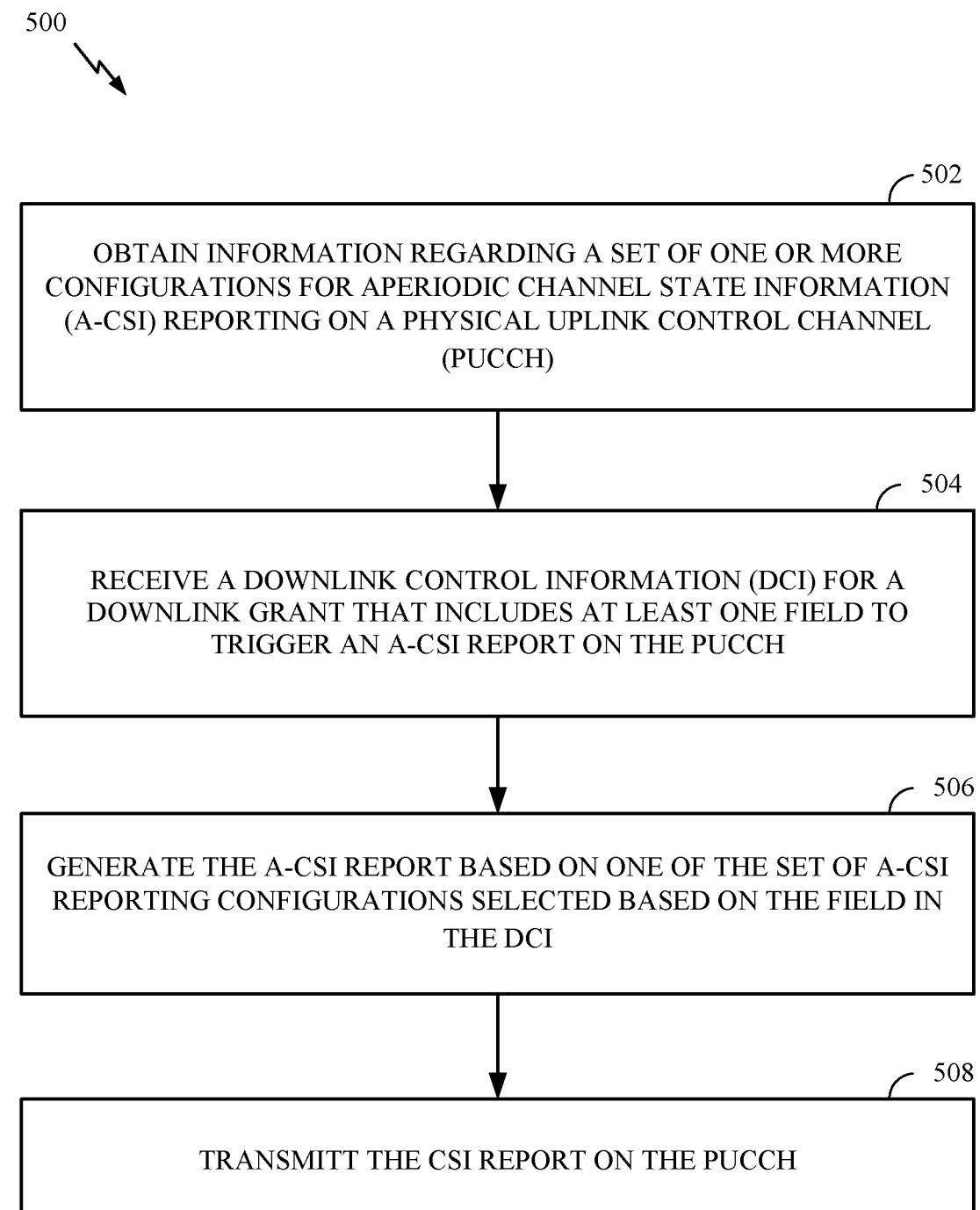

502

OBTAIN INFORMATION REGARDING A SET OF ONE OR MORE CONFIGURATIONS FOR APERIODIC CHANNEL STATE INFORMATION (A-CSI) REPORTING ON A PHYSICAL UPLINK CONTROL CHANNEL (PUCCH)

504

RECEIVE A DOWNLINK CONTROL INFORMATION (DCI) FOR A DOWNLINK GRANT THAT INCLUDES AT LEAST ONE FIELD TO TRIGGER AN A-CSI REPORT ON THE PUCCH

506

GENERATE THE A-CSI REPORT BASED ON ONE OF THE SET OF A-CSI REPORTING CONFIGURATIONS SELECTED BASED ON THE FIELD IN THE DCI

508

TRANSMITT THE CSI REPORT ON THE PUCCH

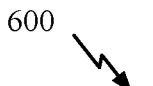

602

SEND A UE INFORMATION REGARDING A SET OF ONE OR MORE
CONFIGURATIONS FOR APERIODIC CHANNEL STATE INFORMATION
(A-CSI) REPORTING ON A PHYSICAL UPLINK CONTROL CHANNEL
(PUCCH)

604

SEND THE UE A FIRST DOWNLINK CONTROL INFORMATION (DCI) FOR
A DOWNLINK GRANT THAT INCLUDES AT LEAST ONE FIELD TO
TRIGGER AN A-CSI REPORT ON THE PUCCH

606

RECEIVE, FROM THE UE, THE PUCCH CARRYING THE A-CSI REPORT
GENERATED BASED ON ONE OF THE SET OF A-CSI REPORTING
CONFIGURATIONS SELECTED BASED ON THE FIELD IN THE DCI

FIG. 6

SIGNALING ASPECTS OF APERIODIC CSI REPORTING TRIGGERED BY A DOWNLINK GRANT

CROSS-REFERENCE TO RELATED APPLICATIONS

This application is a national stage application under 35 U.S.C. 371 of PCT/CN2020/073100, filed Jan. 20, 2020, which is hereby expressly incorporated by reference herein in its entirety as if fully set forth below and for all applicable purposes.

INTRODUCTION

Aspects of the present disclosure relate to wireless communications, and more particularly, to techniques for configuring and triggering aperiodic channel state information (A-CSI) reporting.

DESCRIPTION OF RELATED ART

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

In some examples, a wireless multiple-access communication system may include a number of base stations (BSs), which are each capable of simultaneously supporting communication for multiple communication devices, otherwise known as user equipments (UEs). In an LTE or LTE-A network, a set of one or more base stations may define an eNodeB (eNB). In other examples (e.g., in a next generation, a new radio (NR), or 5G network), a wireless multiple access communication system may include a number of distributed units (DUs) (e.g., edge units (EUs), edge nodes (ENs), radio heads (RHs), smart radio heads (SRHs), transmission reception points (TRPs), etc.) in communication with a number of central units (CUs) (e.g., central nodes (CNs), access node controllers (ANCs), etc.), where a set of one or more DUs, in communication with a CU, may define an access node (e.g., which may be referred to as a BS, next generation NodeB (gNB or gNodeB), TRP, etc.). A BS or DU may communicate with a set of UEs on downlink channels (e.g., for transmissions from a BS or DU to a UE) and uplink channels (e.g., for transmissions from a UE to a BS or DU).

These multiple access technologies have been adopted in various telecommunication standards to provide a common protocol that enables different wireless devices to communicate on a municipal, national, regional, and even global level. New radio (e.g., 5G NR) is an example of an emerging telecommunication standard. NR is a set of enhancements to the LTE mobile standard promulgated by 3GPP. NR is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL). To these ends, NR supports beamforming, multiple-input multiple-output (MIMO) antenna technology, and carrier aggregation.

As the demand for mobile broadband access continues to increase, there exists a need for further improvements in NR and LTE technology. Preferably, these improvements should be applicable to other multi-access technologies and the telecommunication standards that employ these technologies.

SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved communications between wireless communication devices.

Certain aspects provide a method for wireless communications by a user equipment. The method generally includes obtaining information regarding a set of one or more configurations for aperiodic channel state information (A-CSI) reporting on a physical uplink control channel (PUCCH), receiving a downlink control information (DCI) for a downlink grant that includes at least one field to trigger an A-CSI report on the PUCCH, generating the A-CSI report based on one of the set of A-CSI reporting configurations selected based on the field in the DCI, and transmitting the CSI report on the PUCCH.

Certain aspects provide a method for wireless communications by a network entity. The method generally includes sending a UE information regarding a set of one or more configurations for aperiodic channel state information (A-CSI) reporting on a physical uplink control channel (PUCCH), sending the UE a first downlink control information (DCI) for a downlink grant that includes at least one field to trigger an A-CSI report on the PUCCH, and receiving, from the UE, the PUCCH carrying the A-CSI report generated based on one of the set of A-CSI reporting configurations selected based on the field in the DCI.

Aspects of the present disclosure provide means for, apparatus, processors, and computer-readable mediums for performing the methods described herein.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain typical aspects of this disclosure and are therefore not to be considered limiting of its scope, for the description may admit to other equally effective aspects.

FIG. 5 illustrates example operations for wireless communication by a user equipment, in accordance with various aspects of the disclosure.

FIG. 6 illustrates example operations for wireless communication by a network entity, in accordance with various aspects of the disclosure.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Aspects of the present disclosure provide techniques for configuring and triggering aperiodic channel state information (A-CSI) reporting via a downlink grant. As will be described in greater detail below, the A-CSI report may be conveyed via a physical uplink control channel (PUCCH), which may enable faster A-CSI reporting than A-CSI reporting sent on a physical uplink shared channel (PUSCH). This may provide a network entity (e.g., a base station) with more up-to-date CSI information, which in turn may help optimize the DL scheduling.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs. In some cases, a 5G NR RAT network may be deployed.

Figure 1:
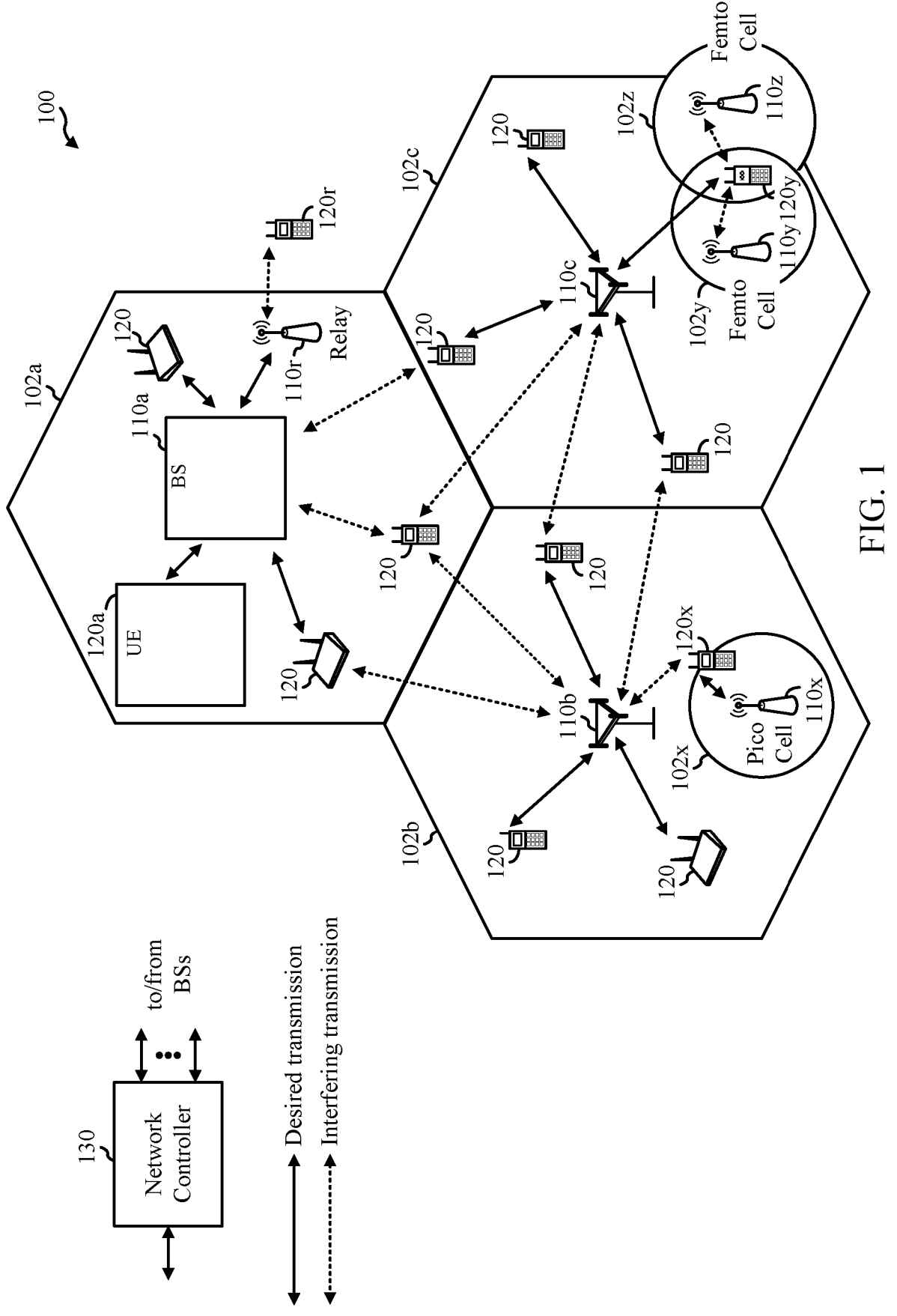
FIG. 1 is a block diagram conceptually illustrating an example telecommunications system, in which certain aspects of the present disclosure may be implemented.

FIG. 1 illustrates an example wireless communication network 100 in which aspects of the present disclosure may be performed. For example, one or more UEs 120 in the network 100 may be configured to perform operations 500 of FIG. 5 to generate A-CSI reports, triggered by downlink grants and sent on PUCCH. Similarly, base stations 110 (e.g., gNBs) in the network 100 may be configured to perform operations 600 of FIG. 6 to configure and trigger UEs 120 (performing operations 500) to generate and send A-CSI reports on PUCCH.

As illustrated in FIG. 1, the wireless communication network 100 may include a number of base stations (BSs) 110a-z (each also individually referred to herein as BS 110 or collectively as BSs 110) and other network entities. A BS 110 may provide communication coverage for a particular geographic area, sometimes referred to as a "cell", which may be stationary or may move according to the location of a mobile BS 110. In some examples, the BSs 110 may be interconnected to one another and/or to one or more other BSs or network nodes (not shown) in wireless communication network 100 through various types of backhaul interfaces (e.g., a direct physical connection, a wireless connection, a virtual network, or the like) using any suitable transport network. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BSs for the femto cells 102y and 102z, respectively. A BS may support one or multiple cells. The BSs 110 communicate with user equipment (UEs) 120a-y (each also individually referred to herein as UE 120 or collectively as UEs 120) in the wireless communication network 100. The UEs 120 (e.g., 20x, 120y, etc.) may be dispersed throughout the wireless communication network 100, and each UE 120 may be stationary or mobile.

Wireless communication network 100 may also include relay stations (e.g., relay station 110r), also referred to as relays or the like, that receive a transmission of data and/or other information from an upstream station (e.g., a BS 110a or a UE 120r) and sends a transmission of the data and/or other information to a downstream station (e.g., a UE 120 or a BS 110), or that relays transmissions between UEs 120, to facilitate communication between devices.

A network controller 130 may couple to a set of BSs 110 and provide coordination and control for these BSs 110. The network controller 130 may communicate with the BSs 110 via a backhaul. The BSs 110 may also communicate with one another (e.g., directly or indirectly) via wireless or wireline backhaul.

Figure 2:
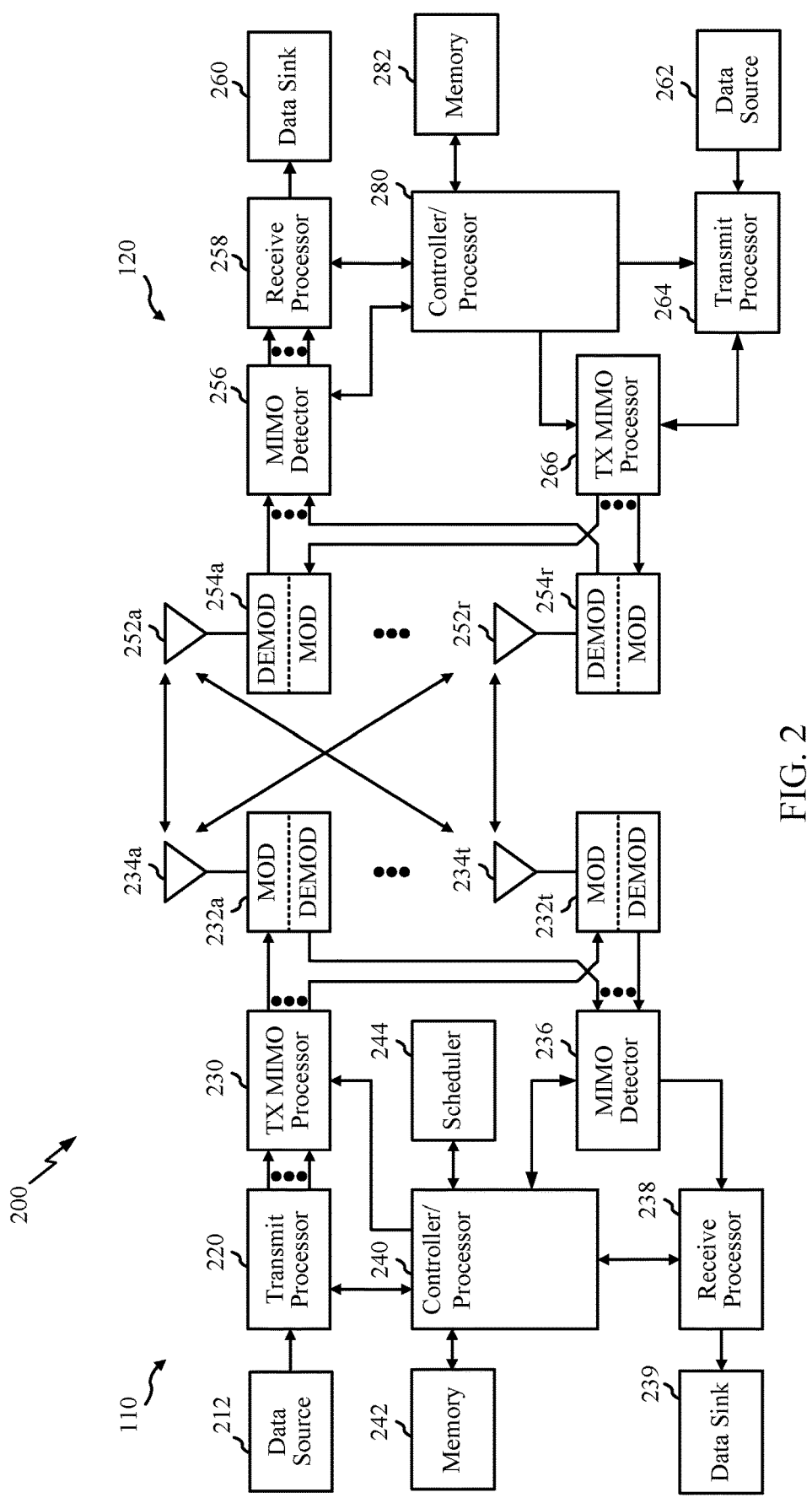
FIG. 2 is a block diagram conceptually illustrating a design of an example a base station (BS) and user equipment (UE), in which certain aspects of the present disclosure may be implemented.

FIG. 2 illustrates example components of BS 110 and UE 120 (e.g., in the wireless communication network 100 of FIG. 1), which may be used to implement aspects of the present disclosure. For example, antennas 252, processors 266, 258, 264, and/or controller/processor 280 of the UE 120 may be configured to perform operations 500 of FIG. 5. Similarly, antennas 234, processors 220, 230, 238, and/or controller/processor 240 of the BS 110 may be configured to perform operations 600 of FIG. 6.

At the BS 110, a transmit processor 220 may receive data from a data source 212 and control information from a controller/processor 240. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), etc. The data may be for the physical downlink shared channel (PDSCH), etc. The processor 220 may process (e.g., encode and symbol map) the data and control information to obtain data symbols and control symbols, respectively. The transmit processor 220 may also generate reference symbols, such as for the primary synchronization signal (PSS), secondary synchronization signal (SSS), and cell-specific reference signal (CRS). A transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) 232a-232t. Each modulator 232 may process a respective output symbol stream (e.g., for OFDM, etc.) to obtain an output sample stream. Each modulator may further process (e.g., convert to analog, amplify, filter, and upconvert) the output sample stream to obtain a downlink signal. Downlink signals from modulators 232a-232t may be transmitted via the antennas 234a-234t, respectively.

At the UE 120, the antennas 252a-252r may receive downlink signals from the BS 110 or a parent IAB-node, or a child IAB-node may receive downlink signals from a parent IAB-node, and may provide received signals to the demodulators (DEMODs) in transceivers 254a-254r, respectively. Each demodulator 254 may condition (e.g., filter, amplify, downconvert, and digitize) a respective received signal to obtain input samples. Each demodulator may further process the input samples (e.g., for OFDM, etc.) to obtain received symbols. A MIMO detector 256 may obtain received symbols from all the demodulators 254a-254r, perform MIMO detection on the received symbols if applicable, and provide detected symbols. A receive processor 258 may process (e.g., demodulate, deinterleave, and decode) the detected symbols, provide decoded data for the UE 120 to a data sink 260, and provide decoded control information to a controller/processor 280.

On the uplink, at UE 120 or a child IAB-node, a transmit processor 264 may receive and process data (e.g., for the physical uplink shared channel (PUSCH) or the PSSCH) from a data source 262 and control information (e.g., for the physical uplink control channel (PUCCH) or the PSCCH) from the controller/processor 280. The transmit processor 264 may also generate reference symbols for a reference signal (e.g., for the sounding reference signal (SRS)). The symbols from the transmit processor 264 may be precoded by a TX MIMO processor 266 if applicable, further processed by the demodulators in transceivers 254a-254r (e.g., for SC-FDM, etc.), and transmitted to the base station 110 or a parent IAB-node.

At the BS 110 or a parent IAB-node, the uplink signals from the UE 120 may be received by the antennas 234, processed by the modulators 232, detected by a MIMO detector 236 if applicable, and further processed by a receive processor 238 to obtain decoded data and control information sent by the UE 120. The receive processor 238 may provide the decoded data to a data sink 239 and the decoded control information to the controller/processor 240.

The controllers/processors 240 and 280 may direct the operation at the BS 110 and the UE 120, respectively. The controller/processor 240 and/or other processors and modules at the BS 110 may perform or direct the execution of processes for the techniques described herein. The controller/processor 280 and/or other processors and modules at the UE 120 may perform or direct the execution of processes for the techniques described herein. The memories 242 and 282 may store data and program codes for BS 110 and UE 120, respectively. A scheduler 244 may schedule UEs for data transmission on the downlink and/or uplink.

Example Signaling Aspects of A-CSI Triggered by Dl Grant

In New Radio (NR) deployments, a UE may support communications (traffic) with various service types. For example, NR UEs may support enhanced mobile broadband (eMBB) targeting wide bandwidth (e.g., 80 MHz or beyond), millimeter wave (mmW) targeting high carrier frequency (e.g., 25 GHz or beyond), massive machine type communications MTC (mMTC) targeting non-backward compatible MTC techniques, and/or mission critical targeting ultra-reliable low-latency communications (URLLC).

The general goal of CSI reporting by a UE is to help ensure that a gNB has current information regarding channel conditions. In some cases, a UE may need to report CSI information as fast as possible to ensure the gNB has the most up-to-date information. To better serve different types of traffic, a UE may have some specific configurations for CSI reporting. For example, in NR (Rel-15 and 16), a base station may schedule the UE to transmit an aperiodic CSI report (A-CSI) on PUSCH using the UL grant to provide current CSI information.

Figure 3:
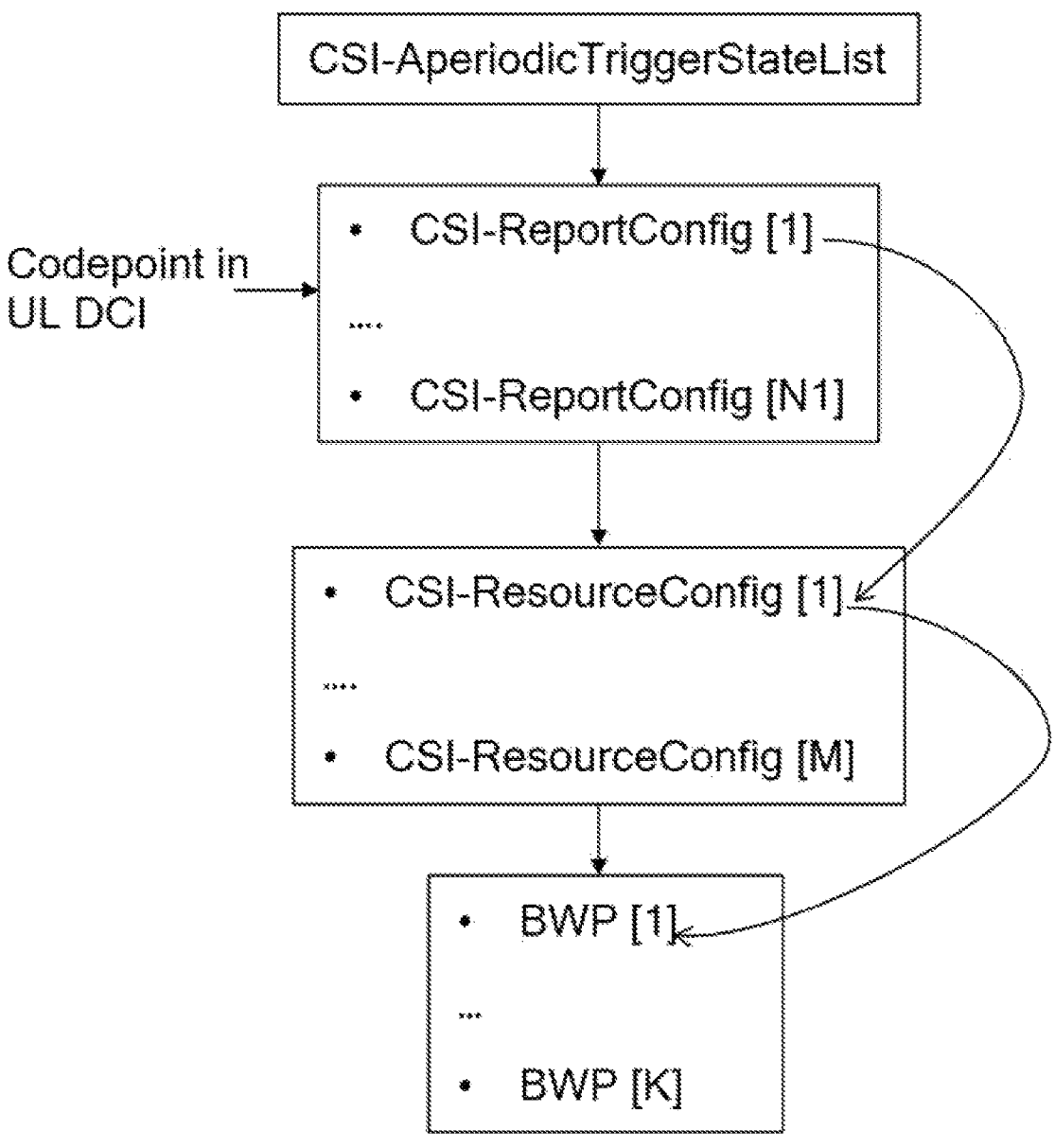
FIG. 3 illustrates an example CSI reporting configuration.

FIG. 3 illustrates one example of aperiodic CSI reporting configurations. The CSI reporting configurations may have different parameters, for example, to implement the various types of restrictions discussed above with respect to URLLC CSI reporting.

As illustrated in FIG. 3, a UE may be configured with a set of (N1) CSI reporting configurations. In some cases, the UE may receive (via RRC signaling) a CSI-AperiodicTriggerStateList that identifies the CSI reporting configurations. Each CSI reporting configuration may be associated with one or more (e.g., up to 3) of M CSI resource configurations. CSI-resources may be in one or more of K bandwidth parts (BWPs).

As illustrated, an uplink DCI (UL grant) received by the UE may trigger an A-CSI report on a PUSCH according to one of the N1 CSI reporting configurations. A codepoint in the UL DCI may select which of the N1 CSI reporting configurations is selected.

Figure 4:
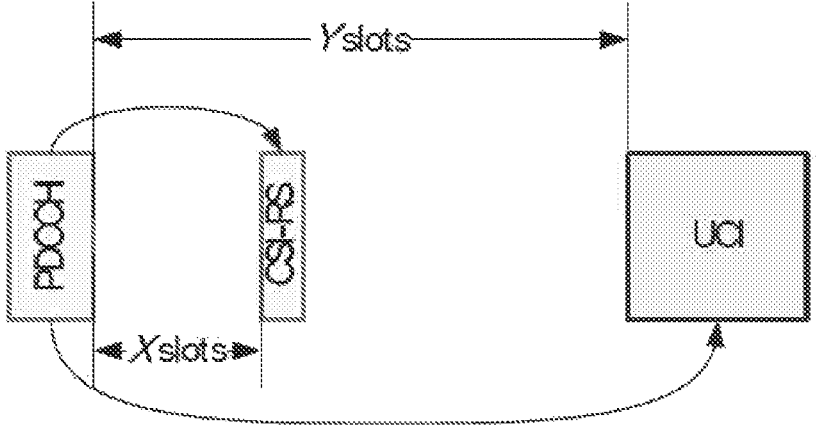
FIG. 4 is a diagram illustrating example resources for A-CSI transmission.

FIG. 4 is a diagram illustrating example resources for A-CSI transmission. As illustrated, one or more parameters may indicate timing for CSI-RS resources and a corresponding PUSCH to carry the A-CSI report (as uplink control information UCI). For example, a first scheduling offset X may indicate a gap (in terms of slots) between the PDCCH carrying the DCI triggering the A-CSI report and the CSI-RS. A second scheduling offset Y may indicate a gap between the PDCCH and the A-CSI reporting (UCI) on PUSCH.

Scheduling offset X may be RRC configured, while scheduling offset Y may be signaled by reusing the time-domain resource allocation (TDRA) field in the UL grant for the corresponding PUSCH transmission. Frequency domain resources for the A-CSI transmitted on the PUSCH may also be indicated in the UL grant, for example, via a frequency-domain resource allocation (FDRA) field.

As noted above, in some cases, aspects of the present disclosure may allow a DL grant to trigger aperiodic CSI report on PUCCH. As noted above, this may enable faster A-CSI report than A-CSI reporting on PUSCH, providing a base station with more up-to-date CSI information to help with DL scheduling.

The following description provides example signaling mechanisms for configuring the CSI trigger state for A-CSI reporting on PUCCH, indicating the CSI-RS resources for measurement, time and frequency resources for sending the A-CSI on PUCCH.

FIG. 5 illustrates example operations 500 for wireless communications by a user equipment (UE), in accordance with aspects of the present disclosure. For example, operations 500 may be performed by a UE 120 shown in FIGS. 1 and 2 to generate an A-CSI report, triggered by a DL grant, and send the A-CSI report on a PUCCH.

Operations 500 begin at 502, by obtaining information regarding a set of one or more configurations for aperiodic channel state information (A-CSI) reporting on a physical uplink control channel (PUCCH). At 504, the UE receives a downlink control information (DCI) for a downlink grant that includes at least one field to trigger an A-CSI report on the PUCCH. At 506, the UE generates the A-CSI report based on one of the set of A-CSI reporting configurations selected based on the field in the DCI. At 508, the UE transmits the CSI report on the PUCCH.

FIG. 6 illustrates example operations 600 for wireless communications by a network entity, in accordance with aspects of the present disclosure. For example, operations 600 may be performed by a BS 110 (e.g., a gNB) shown in FIGS. 1 and 2 to trigger a UE 120 (performing operations 500 of FIG. 5) to generate and send an A-CSI report on PUCCH.

Operations 600 begin at 602, by sending a UE information regarding a set of one or more configurations for aperiodic channel state information (A-CSI) reporting on a physical uplink control channel (PUCCH). At 604, the UE sends the UE a first downlink control information (DCI) for a downlink grant that includes at least one field to trigger an A-CSI report on the PUCCH. At 606, the UE receives, from the UE, the PUCCH carrying the A-CSI report generated based on one of the set of A-CSI reporting configurations selected based on the field in the DCI.

Figure 7:
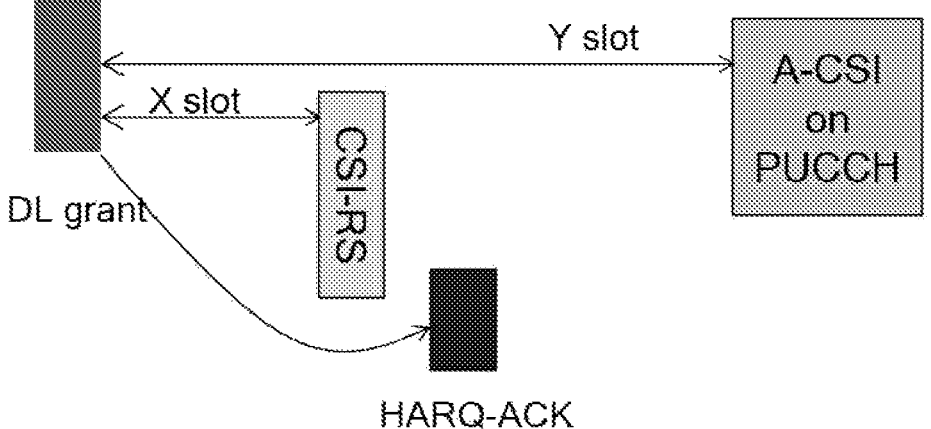
FIG. 7 is a diagram illustrating example resources for A-CSI transmission, in accordance with various aspects of the disclosure.

FIG. 7 is a diagram illustrating an example of a DL grant (a DL scheduling DCI) triggered A-CSI report sent on PUCCH, in accordance with various aspects of the disclosure.

In some cases, the DL grant may also include a bit that indicates whether the DCI also actually schedules a DL data transmission or not. In other words, the DCI could be used only to trigger A-CSI report but not schedule a downlink data transmission. In this case, the base station can set this bit to zero to indicate that no data is to be scheduled by the DL grant.

In some cases, an A-CSI request field may be provided in the DL grant to trigger an A-CSI report on PUCCH. The UE may be configured with a list of CSI report configurations per DL serving cell (or per DL BWP). Each codepoint (except for an all-zero codepoint) of the A-CSI request field may indicate a particular A-CSI report configuration that includes one or more CSI resources in the corresponding DL serving cell or DL BWP. As in the case of A-CSI triggered by UL grant, the all-zero code point may indicate no A-CSI report is requested by this DL grant.

In case the list of CSI report configurations is configured per serving cell, the UE may not expect to be triggered with a CSI report corresponding to a CSI resource for the non-active BWP of the serving cell. In other words, the CSI resource for the A-CSI report triggered by the DL grant should be on the same BWP as the corresponding PDSCH data. In the case of cross-carrier DL scheduling, the codepoints (except the all-zero codepoint) may be associated with CSI resources that are on the scheduled cell (on which the data transmission is scheduled).

In NR (Rel 15 or 16), an RRC parameter "reportConfig-Type" is configured for each CSI-report configuration, which takes one of the following types: Periodic, SemiPer-sistentOnPUSCH, SemiPersistentOnPUCCH, or Aperiodic. Aspects of the present disclosure propose a new CSI Report Config Type (e.g., which may be referred to as Aperiodi-cOnPUCCH) to indicate that the present CSI report configuration is for Aperiodic CSI reporting on PUCCH (triggered by DL grant).

For CSI report configuration that is configured with the new CSI report config type, the following new RRC parameters could be configured:

A-CSI report offset (i.e., scheduling offset Yin FIG. 7); and

A PUCCH resource per UL BWP.

When the DCI selects a CSI report configuration with the new CSI report config type, the UE will use the "A-CSI report offset" parameter to determine in which slot the PUCCH carrying the A-CSI report is to be transmitted. The UE will also use the PUCCH resource configured for the active UL BWP as the PUCCH resource to transmit the PUCCH carrying the A-CSI report in the determined slot. In some cases, a CSI report configuration setting with this new configuration type (AperiodicOnPUCCH) can only be triggered by a DL grant (and not by an UL grant).

In some cases, one CSI resource setting may be associated with both UL grant and DL grant. In such cases, new RRC parameters may be introduced for the trigger offset (scheduling offset X in FIG. 7) of the CSI-RS resource, which is used when the CSI resource is triggered by a DL grant (e.g., this parameter may be referred to as aperiodicTriggering-OffsetByDL_DCI).

In some cases, one or more parameters may be dynamically indicated. For example, the DL grant may contain one or more of the following fields that are used to indicate the PUCCH for HARQ-ACK feedback:

PUCCH resource indication (PRI), indicating a PUCCH resource for sending the HARQ-ACK feedback; and a PDSCH-to-HARQ_feedback timing indicator (e.g., a K1 indicator), indicating the slot over which the PUCCH for HARQ-ACK (as shown in FIG. 7) is transmitted.

As an alternative to using RRC configured parameters, the base station may dynamically indicate the A-CSI reporting slot and/or the PUCCH resource used to carry A-CSI to the UE.

For example, for the reporting slot (scheduling offset Y in FIG. 7), the base station may use a new DCI field to indicate the scheduling Y. As another option, the base station may reuse the k1 indicator in the DL DCI to indicate the scheduling offset Y. In this case, a new set of Y values may be configured via RRC, and each codepoint (of the reused k1 indicator) maps to a particular Y value in the set. In some cases, separate sets of Y values may be configured for each CSI report configuration. Alternatively, the same set of Y values may be configured for all CSI report configurations. Still another option is for the base station to reuse some other existing field in the DCI format to indicate the scheduling offset Y (e.g., a TDRA or FDRA field). The approach of signaling sets of values via RRC (whether the same set is configured for all CSI report configurations or separate sets are configured for each CSI report configuration) and selecting one of the values in the set may also be applied to other options discussed herein for indicating the slot offset (e.g., adding new field in DCI, reusing the k1 field, or reusing other fields such as TDRA or FDRA).

For the PUCCH resource used to transmit the A-CSI report, the base station may reuse the PUCCH resource indicator (PRI) field for PUCCH for HARQ-ACK, in cases where the HARQ-ACK and A-CSI report are transmitted in different slots. Another option is for the base station to use a new PRI field to indicate the PUCCH resource for A-CSI report. Still another option is for the base station to reuse another other existing filed in the DCI format to indicate the PUCCH resource (e.g., FDRA or TDRA).

Figure 8:
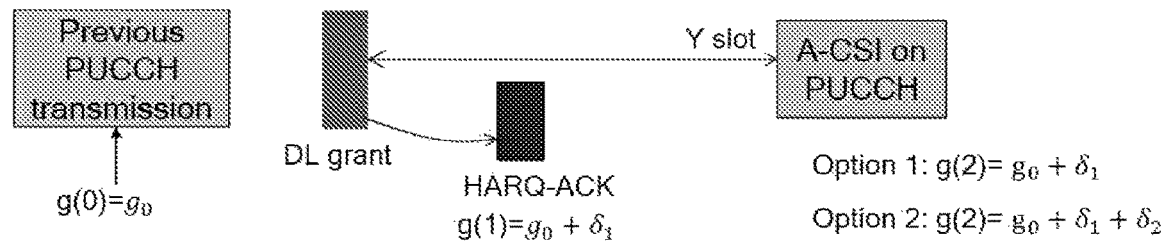
FIGS. 8-10 illustrate examples for transmit power control (TPC) for A-CSI reporting, in accordance with various aspects of the disclosure.
Figure 9:
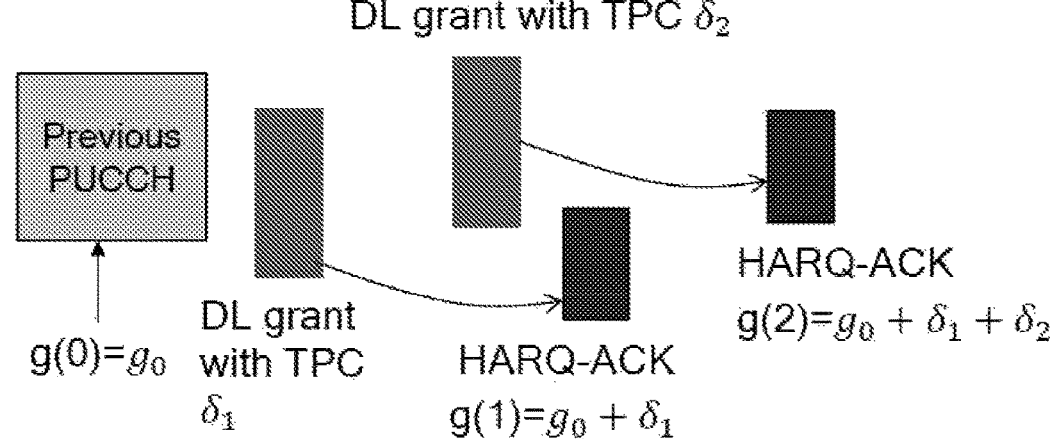
Figure 10:
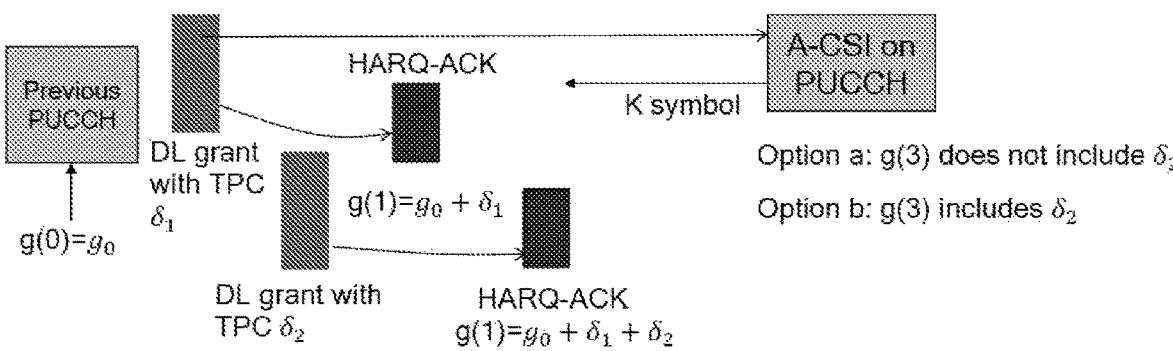

FIGS. 8-10 illustrate examples for transmit power control (TPC) for A-CSI reporting, in accordance with various aspects of the disclosure. In FIGS. 8-10, g(L), L=0, 1, 2, . . . denotes the closed-loop power control adjustment state for the PUCCH transmission occasion L. This adjustment state is determined based on the TPC commands received in one or more DCIs. And the total transmit power for the PUCCH is determined at least in part on this closed-loop power control adjustment state.

DL grants typically contains a 2-bit TPC field that is used to indicate transmit power for the PUCCH carrying HARQ-ACK feedback. In some cases, when A-CSI report on PUCCH is also triggered by the DL grant, the same (existing) TPC field ($\delta_1$) in DCI may be applied to both the PUCCH transmission for HARQ-ACK and the PUCCH transmission for A-CSI report (as shown as Option 1 in FIG. 8).

As an alternative, shown as Option 2 in FIG. 8, separate TPC fields can be configured for the power control for HARQ-ACK and A-CSI. As illustrated, the TPC for A-CSI ($\delta_2$) could be interpreted as additional power (for a sum of $\delta_1+\delta_2$) needed for transmitting A-CSI compared with HARQ-ACK.

As illustrated in FIG. 9, in NR (Rel-15/16), when a UE computes the closed-loop power control adjustment state for a PUCCH transmission scheduled by DCI, it only accumulates the TPC received prior to the last symbol corresponding to the DL grant. In the illustrated example, for the first HARQ-ACK transmission, the second TPC command $\delta_2$ does not apply despite the DL grant carrying the second TPC command $\delta_2$ is received prior to the transmission of the PUCCH carrying the first HARQ-ACK transmission. (though the UE does apply the TPC received in the current DL grant).

One consideration for A-CSI triggered by a DL grant is whether the UE should accumulate a TPC command received after the DL grant. As illustrated in FIG. 10, one option (shown as Option a) is for the UE to only apply TPC commands received before the last symbol of the DL grant scheduling the A-CSI. In this case, the closed-power control adjustment state g(3) for the PUCCH transmission carrying the A-CSI report does not include the contribution due to the second TPC command $\delta_2$. Another option (shown as Option b) is for the UE to apply TPC commands received up to K OFDM symbols before the transmission of the A-CSI on PUCCH. For example, K may be set as:

$$K=K_{2,min}*N_{symbol}^{slot},$$

where $K_{2,min}$ denotes the minimum k2 value configured for the active UL BWP of the serving cell, and $N_{symbol}^{slot}$ denotes the number of symbols per slot. In the example illustrated in FIG. 10, according to Option b, since the second TPC $\delta_2$ is received by the UE more than K symbols before the transmission of PUCCH carrying the A-CSI report, the UE includes/adds the $\delta_2$ in the closed-loop power control adjustment state.

In NR, a base station could use a group-common DCI format 2_2 scrambled with a TPC-PUCCH-RNTI to signal power control for PUCCH transmission. The group-common DCI may contain multiple power control fields in the following form:

Block number 1, block number 2, block number 3, . . . , Block number N, where each block number corresponds to a TPC command for a particular UE. Each UE may be configured with a block number index, via RRC signaling, and will use this block number index to determine its TPC command in the received group-common DCI, in order to perform power control for PUCCH.

When A-CSI on PUCCH triggered by DL DCI is supported as proposed herein, a UE may expect that the same TPC-PUCCH-RNTI and the same TPC block number index will be applicable for power control for A-CSI on PUCCH. For example, referring back to FIG. 10, a UE may receive the second TPC command ($\delta_2$) in a group-common DCI scrambled with the TPC-PUCCH-RNTI and associated with the configured block number index. In this case, according to Option b, the UE may include the power $\delta_2$ in g(3), based on the group-common TPC being received K symbols prior to the transmission of the A-CSI on PUCCH. According to Option a, the UE will not include $\delta_2$ in g(3), based on determining that the group-common TPC is received after the DL grant that schedules the A-CSI on PUCCH.

In some cases, the UE may be configured with a new RNTI (e.g., TPC-A-CSI-PUCCH-RNTI) and/or a separate block number index to use for determining a TPC from the group-common DCI that is used specifically for the power control for A-CSI on PUCCH. In other words, in such cases, the UE applies the power control from the group-common DCI only if the DCI is scrambled with this new RNTI and applies the TPC corresponding to the new block number index used for this purpose.

As described herein, allowing a DL grant to trigger aperiodic CSI report on PUCCH may enable faster A-CSI report than A-CSI reporting on PUSCH. Providing a base station with more up-to-date CSI information in this manner may help the base station optimize DL scheduling.

The techniques described herein may be used for various wireless communication technologies, such as 3GPP Long Term Evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks. The terms "network" and "system" are often used interchangeably.

A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). LTE and LTE-A are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3 GPP2).

The techniques described herein may be used for the wireless networks and radio technologies mentioned above as well as other wireless networks and radio technologies. For clarity, while aspects may be described herein using terminology commonly associated with 3G, 4G, and/or 5G wireless technologies, aspects of the present disclosure can be applied in other generation-based communication systems.

New Radio (NR) is an emerging wireless communications technology under development in conjunction with the 5G Technology Forum (5GTF). NR access (e.g., 5G NR) may support various wireless communication services, such as enhanced mobile broadband (eMBB) targeting wide bandwidth (e.g., 80 MHz or beyond), millimeter wave (mmW) targeting high carrier frequency (e.g., 25 GHz or beyond), massive machine type communications MTC (mMTC) targeting non-backward compatible MTC techniques, and/or mission critical targeting ultra-reliable low-latency communications (URLLC). These services may include latency and reliability requirements. These services may also have different transmission time intervals (TTI) to meet respective quality of service (QoS) requirements. In addition, these services may co-exist in the same subframe.

In 3GPP, the term "cell" can refer to a coverage area of a Node B (NB) and/or a NB subsystem serving this coverage area, depending on the context in which the term is used. In NR systems, the term "cell" and BS, next generation NodeB (gNB or gNodeB), access point (AP), distributed unit (DU), carrier, or transmission reception point (TRP) may be used interchangeably. A BS may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS.

A UE may also be referred to as a mobile station, a terminal, an access terminal, a subscriber unit, a station, a Customer Premises. Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a "resource block" (RB)) may be 12 subcarriers (or 180 kHz). Consequently, the nominal Fast Fourier Transfer (FFT) size may be equal to 128, 256, 512, 1024 or 2048 for system bandwidth of 1.25, 2.5, 5, 10, or 20 megahertz (MHz), respectively. The system bandwidth may also be partitioned into subbands. For example, a subband may cover 1.8 MHz (e.g., 6 RBs), and there may be 1, 2, 4, 8, or 16 subbands for system bandwidth of 1.25, 2.5, 5, 10 or 20 MHz, respectively. In LTE, the basic transmission time interval (TTI) or packet duration is the 1 ms subframe.

NR may utilize OFDM with a CP on the uplink and downlink and include support for half-duplex operation using TDD. In NR, a subframe is still 1 ms, but the basic TTI is referred to as a slot. A subframe contains a variable number of slots (e.g., 1, 2, 4, 8, 16, . . . slots) depending on the subcarrier spacing. The NR RB is 12 consecutive frequency subcarriers. NR may support a base subcarrier spacing of 15 KHz and other subcarrier spacing may be defined with respect to the base subcarrier spacing, for example, 30 kHz, 60 kHz, 120 kHz, 240 kHz, etc. The symbol and slot lengths scale with the subcarrier spacing. The CP length also depends on the subcarrier spacing. Beamforming may be supported and beam direction may be dynamically configured. MIMO transmissions with precoding may also be supported. In some examples, MIMO configurations in the DL may support up to 8 transmit antennas with multi-layer DL transmissions up to 8 streams and up to 2 streams per UE. In some examples, multi-layer transmissions with up to 2 streams per UE may be supported. Aggregation of multiple cells may be supported with up to 8 serving cells.

In some examples, access to the air interface may be scheduled. A scheduling entity (e.g., a BS) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

In some examples, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system. For example, in some cases, processors such as those shown in FIG. 2 may be configured to perform operations 500 of FIG. 5 and/or operations 600 of FIG. 6.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For example, instructions for performing the operations described herein and illustrated in FIGS. 5-6.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method of wireless communication by a user equipment, the method comprising:
   obtaining information regarding a set of one or more configurations for aperiodic channel state information (A-CSI) reporting on a physical uplink control channel (PUCCH);
   receiving a downlink control information (DCI) for a downlink grant, wherein the DCI includes at least one field to trigger an A-CSI report on the PUCCH, wherein the DCI indicates one or more parameters to use for determining time and frequency resources for the PUCCH, and wherein the one or more parameters comprise at least one of: a first field indicating an A-CSI report offset relative to an end of the DCI for the PUCCH; or a second field with codepoint values that map to a set of radio resource control (RRC) configured values for an A-CSI report offset relative to an end of the DCI for the PUCCH;
   generating the A-CSI report based on one of the set of A-CSI reporting configurations selected based on the at least one field in the DCI; and
   transmitting the A-CSI report on the PUCCH.

2. The method of claim 1, wherein the DCI comprises a bit that indicates whether the DCI also schedules a downlink data transmission or not.

3. The method of claim 1, wherein the set of one or more configurations comprise:
   a list of A-CSI reporting configurations per downlink serving cell or per downlink bandwidth part (BWP); and
   each A-CSI reporting configuration includes one or more CSI resources in the corresponding downlink serving cell or BWP.

4. The method of claim 3, wherein different values of a codepoint of the at least one field indicate different A-CSI reporting configuration.

5. The method of claim 4, wherein one value of the codepoint indicates no A-CSI report is requested.

6. The method of claim 3, wherein in case the list of A-CSI reporting configurations is configured per serving cell, the one or more CSI resources for the A-CSI report triggered by a codepoint of the at least one field is on a same BWP as corresponding physical downlink shared channel (PDSCH) data scheduled by the downlink grant.

7. The method of claim 1, wherein in case the DCI is received in a first carrier and schedules a downlink transmission in a second carrier, codepoints of the at least one field are associated with CSI resources on the second carrier.

8. The method of claim 1, wherein:
the set of one or more configurations are of a defined type that indicates the one or more configurations are for A-CSI reporting on the PUCCH; and
the method further comprises receiving RRC signaling of the one or more parameters to use for determining time and frequency resources for the PUCCH.

9. The method of claim 8, wherein the one or more parameters comprise at least one of: the A-CSI report offset relative to the end of the DCI for the PUCCH; or
a PUCCH resource per uplink bandwidth part (BWP).

10. The method of claim 9, wherein the one or more parameters are configured for each of the one or more configurations.

11. The method of claim 1, wherein:
the A-CSI report is generated based on at least one CSI resource setting associated with both uplink and downlink grants;
a first CSI report offset is associated with the at least one CSI resource setting for sending the A-CSI report if triggered by an uplink grant; and
a second CSI report offset is associated with the at least one CSI resource setting for sending the A-CSI report if triggered by a downlink grant.

12. The method of claim 1, wherein at least one of the first field or second field comprises at least one of:
a field that can be used to indicate a scheduling delay for acknowledging a downlink transmission scheduled by a downlink DCI;
a field that can be used to indicate time domain resources for a downlink transmission scheduled by a downlink DCI; or
a field that can be used to indicate frequency domain resources for a downlink transmission scheduled by a downlink DCI.

13. The method of claim 1, wherein the one or more parameters comprise at least one of:
an existing PUCCH resource indicator (PRI) field reused to indicate resources for the PUCCH;
a new PRI field to indicate resources for the PUCCH; or another existing DCI field reused to indicate resources for the PUCCH.

14. The method of claim 1, wherein the DCI also includes at least a first transmit power control (TPC) field for a PUCCH carrying acknowledgment feedback, and further comprising:
applying the first TPC field to both the PUCCH carrying the acknowledgment feedback and the PUCCH carrying the A-CSI report; or
applying the first TPC field to the PUCCH carrying the acknowledgment feedback and a second TPC field to the PUCCH carrying the A-CSI report.

15. The method of claim 14, further comprising:
receiving another DCI with a second TPC field; and
one of:
applying only TPC fields received before a last symbol of the DCI when computing accumulated power or applying both the first and second TPC fields; or
applying TPC fields received up to a number of symbols before transmission of the PUCCH carrying the A-CSI report.

16. The method of claim 1, further comprising:
receiving a group common DCI with a plurality of transmit power control (TPC) fields, including one TPC field for the user equipment; and
applying the TPC field for the user equipment to the PUCCH carrying the A-CSI report.

17. A method of wireless communication by a network entity, the method comprising:
sending a user equipment (UE) information regarding a set of one or more configurations for aperiodic channel state information (A-CSI) reporting on a physical uplink control channel (PUCCH);
sending the UE a first downlink control information (DCI) for a downlink grant, wherein the DCI includes at least one field to trigger an A-CSI report on the PUCCH, wherein the DCI indicates one or more parameters to use for determining time and frequency resources for the PUCCH, and wherein the one or more parameters comprise at least one of: a first field indicating an A-CSI report offset relative to an end of the DCI for the PUCCH; or a second field with codepoint values that map to a set of radio resource control (RRC) configured values for an A-CSI report offset relative to an end of the DCI for the PUCCH; and
receiving, from the UE, the PUCCH carrying the A-CSI report generated based on one of the set of A-CSI reporting configurations selected based on the at least one field in the DCI.

18. The method of claim 17, wherein the DCI comprises a bit that indicates whether the DCI also schedules a downlink data transmission or not.

19. The method of claim 17, wherein the set of one or more configurations comprise:
a list of A-CSI reporting configurations per downlink serving cell or per downlink bandwidth part (BWP); and
each A-CSI reporting configuration includes one or more CSI resources in the corresponding downlink serving cell or BWP.

20. The method of claim 19, wherein different values of a codepoint of the at least one field indicate different A-CSI reporting configuration.

21. The method of claim 20, wherein one value of the codepoint indicates no A-CSI report is requested.

22. The method of claim 19, wherein in case the list of A-CSI reporting configurations is configured per serving cell, the one or more CSI resources for the A-CSI report triggered by a codepoint of the at least one field is on a same BWP as corresponding physical downlink shared channel (PDSCH) data scheduled by the downlink grant.

23. The method of claim 17, wherein in case the DCI is received in a first carrier and schedules a downlink transmission in a second carrier, codepoints of the at least one field are associated with CSI resources on the other cell.

24. The method of claim 17, wherein:
the set of one or more configurations are of a defined type that indicates the one or more configurations are for A-CSI reporting on PUCCH and can only be; and the method further comprises receiving RRC signaling of the one or more parameters to use for determining time and frequency resources for the PUCCH.

25. The method of claim 24, wherein the one or more parameters comprise at least one of: the A-CSI report offset relative to the end of the DCI for the PUCCH; or a PUCCH resource per uplink bandwidth part (BWP).

26. The method of claim 25, wherein the one or more parameters are configured for each of the one or more configurations.

27. The method of claim 17, wherein:

the A-CSI report is generated based on at least one CSI resource setting associated with both uplink and downlink grants;

a first CSI report offset is associated with the at least one CSI resource setting for sending the A-CSI report if triggered by an uplink grant; and a second CSI report offset is associated with the at least one CSI resource setting for sending the A-CSI report if triggered by a downlink grant.

28. The method of claim 17, wherein at least one of:

the first field or second field comprises at least one of: a field that can be used to indicate a scheduling delay for acknowledging a downlink transmission scheduled by a downlink DCI;

a field that can be used to indicate time domain resources for a downlink transmission scheduled by a downlink DCI; or a field that can be used to indicate frequency domain resources for a downlink transmission scheduled by a downlink DCI.

29. The method of claim 17, wherein the one or more parameters comprise at least one of:

an existing PUCCH resource indicator (PRI) field reused to indicate resources for the PUCCH;

a new PRI field to indicate resources for the PUCCH; or another existing DCI field reused to indicate resources for the PUCCH CSI.

30. The method of claim 17, wherein the DCI also includes:

a first transmit power control (TPC) field for a PUCCH carrying acknowledgment feedback; and a second TPC field for the PUCCH carrying the A-CSI report.

31. The method of claim 17, further comprising transmitting a group common DCI with a plurality of transmit power control (TPC) fields, including one TPC field for the UE to apply to the PUCCH carrying the A-CSI report.

* * * * *